(12) United States Patent
Scheerhorn

(10) Patent No.: US 6,419,314 B1
(45) Date of Patent: Jul. 16, 2002

(54) VEHICLE ACCESSORY WITH SLIDING COVER

(75) Inventor: Daniel J. Scheerhorn, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/755,370

(22) Filed: Jan. 5, 2001

(51) Int. Cl.⁷ .................................................. A47C 7/62
(52) U.S. Cl. ............................ 297/188.19; 297/188.14; 312/324; 296/37.8
(58) Field of Search ...................... 297/188.14, 188.15, 297/188.16, 188.17, 188.19, 188.21, 188.01, 188.1, 113, 411.21, 411.37, 411.35; 296/37.8, 97.11; 220/812, 813, 817; 312/324, 334.8

(56) References Cited

U.S. PATENT DOCUMENTS

| 4,598,948 A | 7/1986 | Flowerday |
| 4,818,017 A | 4/1989 | Dykstra et al. |
| 5,076,641 A | 12/1991 | Lindberg |
| RE34,333 E | 8/1993 | Boerema et al. |
| 5,433,509 A | 7/1995 | Hotary et al. |
| 5,562,331 A | 10/1996 | Spykerman et al. |
| 5,810,434 A | 9/1998 | Thompson et al. |
| 5,820,197 A | 10/1998 | Lanser |
| 5,845,965 A | * 12/1998 | Heath et al. ........ 297/188.14 X |
| 6,045,173 A | * 4/2000 | Tiesler et al. ....... 297/188.14 X |
| 6,174,019 B1 | * 1/2001 | Collet et al. ............. 296/97.11 |
| 6,203,088 B1 | * 3/2001 | Fernandez et al. .. 297/411.21 X |
| 6,250,729 B1 | * 6/2001 | Allison et al. .............. 312/324 |
| 6,264,261 B1 | * 7/2001 | Krafcik ............. 297/188.21 X |

FOREIGN PATENT DOCUMENTS

| JP | 2000103290 | * 4/2000 |
| JP | 2000325181 | * 11/2000 |

* cited by examiner

Primary Examiner—Peter M. Cuomo
Assistant Examiner—Stephen Vu
(74) Attorney, Agent, or Firm—Price, Heneveld, Cooper, DeWitt & Litton

(57) ABSTRACT

An armrest storage compartment includes a hinged cover assembly including a base hinged to the storage compartment and a cover slidably mounted to the base by a slide assembly. The slide assembly, in one embodiment, includes a U-shaped rod which is secured to the base and a pair of sleeves mounted to the cover with a polymeric slide material extending between the rod and sleeves to allow the cover to slide forwardly and aft with respect to the base. In a preferred embodiment, the base, when uncovered by moving the cover forwardly, includes a storage tray, cup holder or other accessory, which is stacked above the storage compartment.

18 Claims, 3 Drawing Sheets

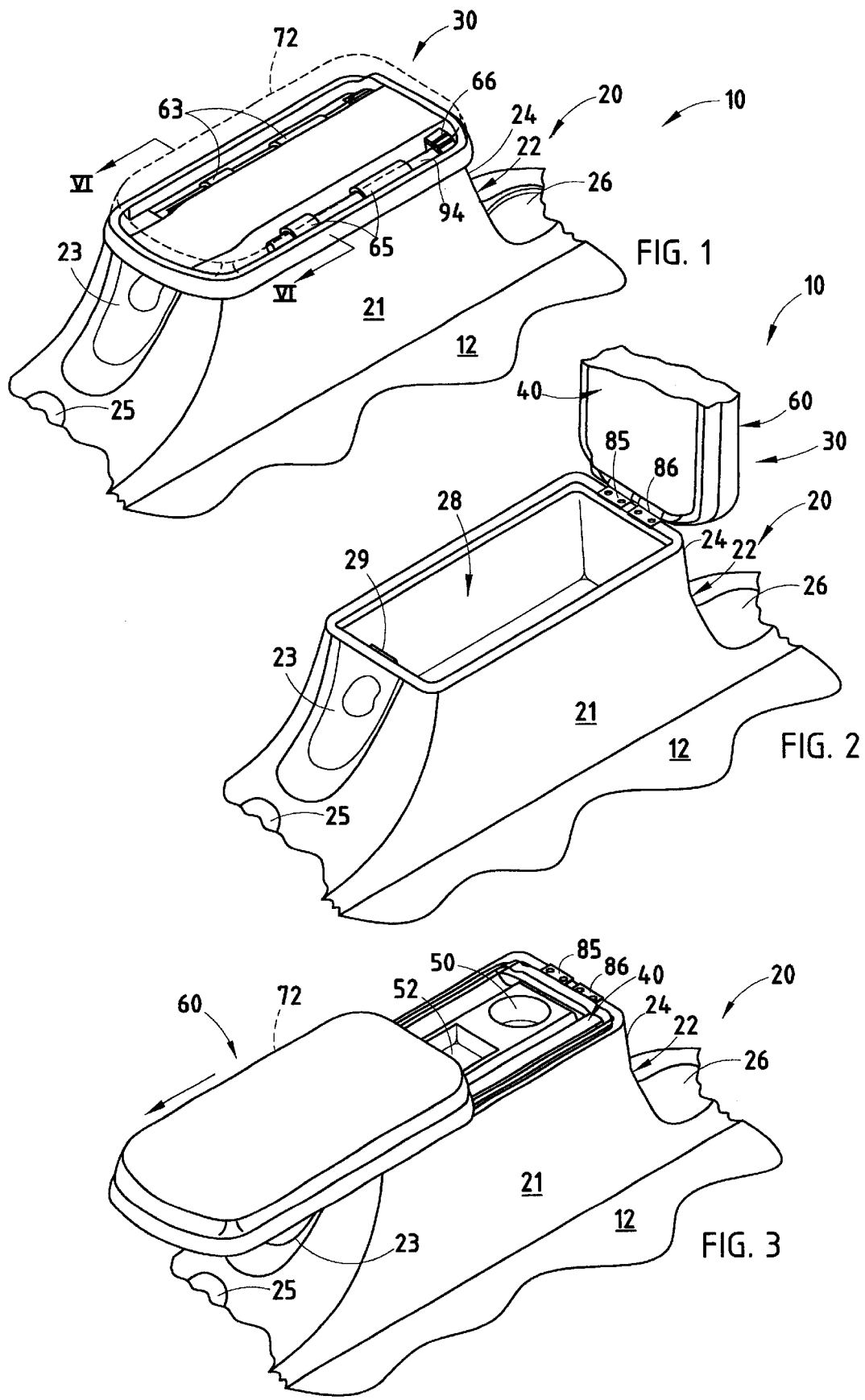

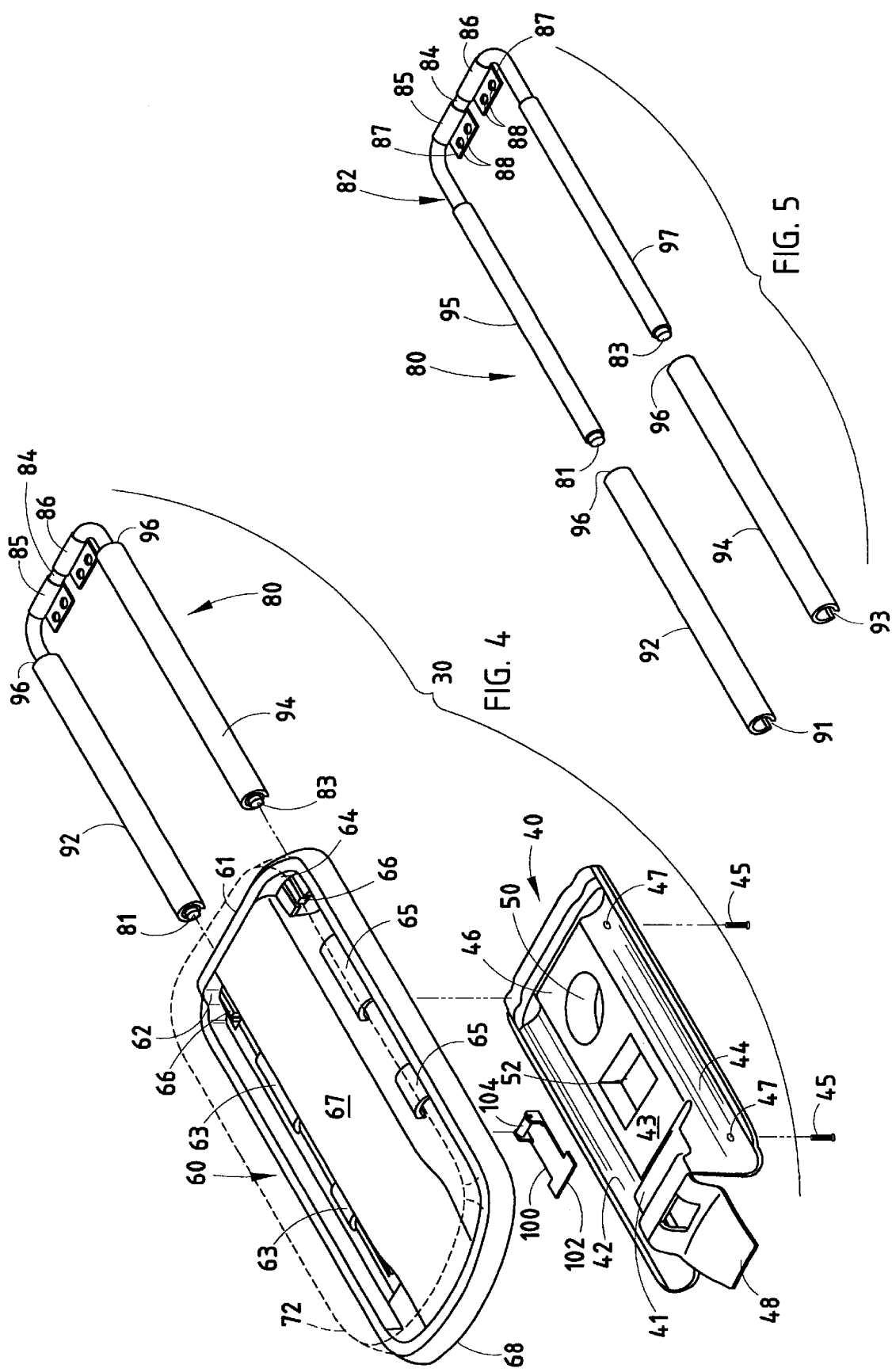

VEHICLE ACCESSORY WITH SLIDING COVER

BACKGROUND OF THE INVENTION

The present invention relates to a vehicle accessory with a sliding cover and particularly an armrest with a storage compartment having a hinged cover assembly having a base and a slidably mounted cover.

Vehicle interior components are increasingly including convenience items for the vehicle operator and passengers. Center consoles located between seats is a typical accessory with may include a storage compartment having a hinged cover also forming an armrest at the top of the console. In the past, the armrest covers could be raised on a hinge mechanism to expose a storage compartment. Some armrests can be slidably moved to a variety of adjusted positions for comfortably locating the armrest for supporting the passenger's and/or operator's forearm. The following patents disclose adjustable armrests or armrests with various storage compartments: U.S. Pat. Nos. 4,598,948, 4,818,017, 5,076,641, U.S. Pat. No. Re. 34,333, U.S. Pat. Nos. 5,433,509, 5,562,331, and 5,810,434.

A difficulty with some adjustable armrests or consoles with adjustable armrests is that the mounting mechanism can be very complex and, therefore, expensive to manufacture and prone to failure during use. As a result, there exists a need for an assembly for a vehicle interior component which includes a sliding, hinged cover for gaining access to a storage compartment and preferably one which also defines an armrest which can be adjusted to a variety of positions for use.

SUMMARY OF THE INVENTION

The system of the present invention provides these features in an economical and reliable system in which a storage compartment includes a hinged cover assembly with the assembly including a base hinged to the storage compartment and a cover slidably mounted to the base by a slide assembly. The slide assembly, in one embodiment, includes a U-shaped rod which is secured to the base and a pair of sleeves mounted to the cover with a polymeric slide material extending between the rod and sleeves to allow the cover to slide with respect to the base. The cover assembly can be pivoted open to gain access to the storage compartment. In a preferred embodiment of the invention, the cover defines an armrest and the base, when uncovered by moving the cover forwardly, includes a storage tray, cup holder or other accessory, which is stacked above the storage compartment to provide vertically stacked storage areas. In a preferred embodiment of the invention, the polymeric slide is integrally molded between the rod and sleeves to provide the sliding interface between them. Such an assembly is relatively inexpensive to manufacture, durable, and reliable to provide the desired functional features for a sliding armrest cover.

These and other features, objects and advantages of the present invention will become apparent upon reading the following description thereof together with reference to the accompanying drawings.

BRIEF DESCRIPTION OF THE DRAWINGS

FIG. 1 is a fragmentary perspective view, shown partly in phantom form, of a vehicle with a console and armrest assembly embodying the present invention;

FIG. 2 is a fragmentary perspective view of the console shown in FIG. 1, shown with the armrest cover assembly in an open position for access to a storage compartment therebelow;

FIG. 3 is a fragmentary perspective view of the console shown in FIG. 1, showing the armrest cover assembly in a closed position with its cover moved to a forwardly adjusted position;

FIG. 4 is an exploded perspective view of the cover assembly;

FIG. 5 is an exploded perspective view of the slide assembly employed in the cover assembly;

DETAILED DESCRIPTION OF THE PREFERRED EMBODIMENT

Figure 6:
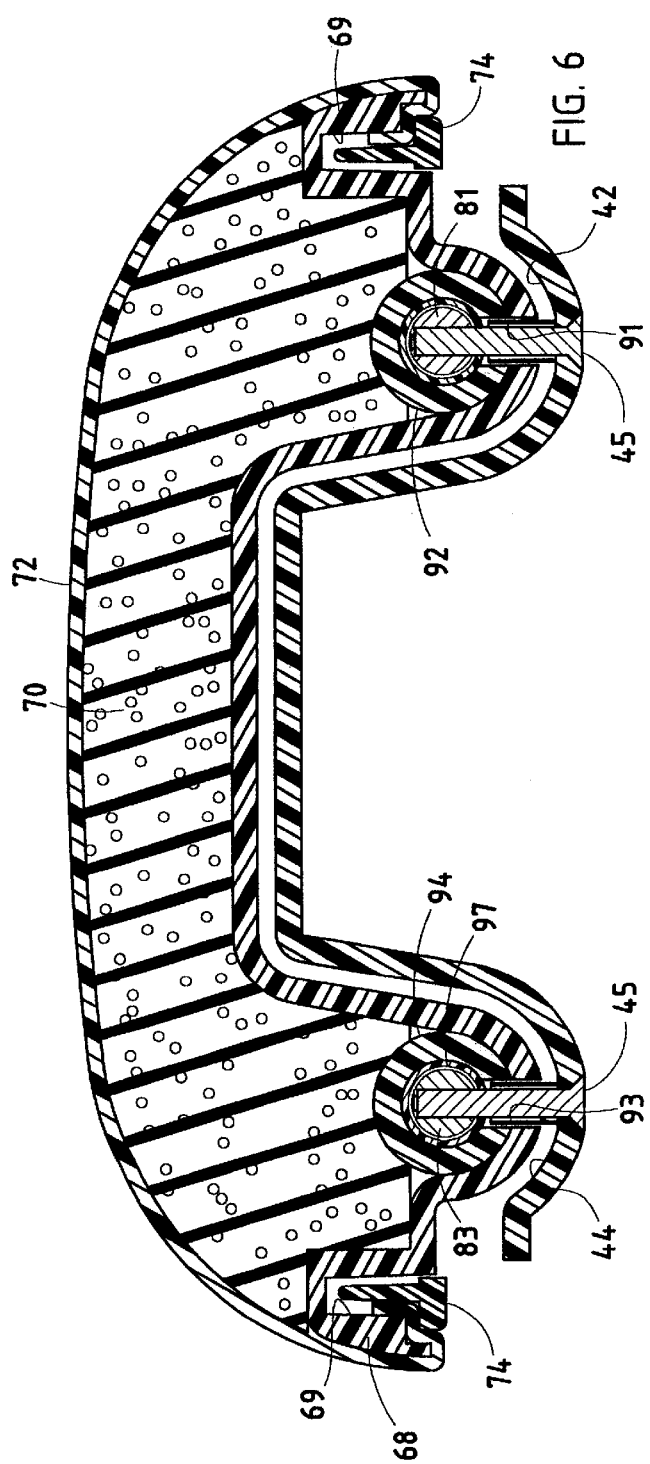
FIG. 6 is an enlarged cross-sectional view of the cover assembly taken along section line VI—VI in FIG. 1.

Referring initially to FIG. 1, there is shown a vehicle 10, such as an automobile, van, sport utility vehicle, or truck, which includes a floor console 20 mounted to the floor 12 of the vehicle between seats (not shown), such as the driver's and front passenger's seats, although it could be located elsewhere in a vehicle. Console 20 includes a body 22 defining therein a storage compartment 28 (FIG. 2) having sidewalls 21, a rear wall 24, and a curved forward wall 23 which may integrally include a cup holder 25. The body 22 may also include a rear cup holder 26 for rear seat passengers. The storage compartment 28 is covered by a hinged cover assembly 30 embodying the present invention.

Assembly 30 includes a base 40 (as best seen in FIG. 4), a cover 60 and a slide assembly 80 which slidably couples the cover 60 to base 40. Base 40, in turn, is pivotally mounted to console 20 to pivot from a closed position (as shown in FIG. 1) to a pivoted open position (as shown in FIG. 2). Additionally, cover 60 can be moved forwardly to one of numerous adjusted positions, as seen in FIG. 3. As seen in FIG. 2, with cover assembly 30 in an open position, storage compartment 28 can be accessed by the vehicle operator or passenger. A latch 48 (FIGS. 4 and 7) on base 40 engages a latch catch 29 on the forward inside edge of wall 23 (FIG. 2) in a conventional manner. An explanation of the construction of cover assembly 30, including base 40, cover 60, and slide 80, is best understood by initially discussing the construction of slide assembly 80 with reference to FIGS. 4, 5, and 6.

Slide assembly 80 comprises a generally U-shaped solid steel rod 82 having a first elongated leg 81, a second elongated leg 83, and an integral base leg 84. Attached to the base leg is a pair of torque fittings 85 and 86 having tangs 87 with apertures 88 for mounting the torque fittings and, therefore, slide assembly 80 to the top of rear wall 24 of body 22, as seen in FIG. 2. Torque fittings 85 and 86 define a hinge for coupling the cover assembly 30 to body 22. Each fitting 85 and 86 has an inner surface which is coated with tetrafluoroethylene to control the rotation of base leg 84 and, therefore, the pivot opening of cover assembly 30 with respect to console body 22. Fittings 85 and 86 can be of the type disclosed in U.S. Pat. No. 5,820,197, the disclosure of which is incorporated herein by reference. The slide assembly 80 further includes a pair of sleeves 92 and 94 which can be extruded aluminum members having a generally C-shaped cross section, each with an open bottom slot 91 and 93, respectively, and an interior cross section which corresponds to that of polymeric intermediate slides 95 and 97 on rod legs 81 and 83 to provide a sliding interface between sleeves 92 and 94 and U-shaped rod 82 via the polymeric cylindrical slides 95 and 97. Slides 95 and 97 can be of any suitable lubricious polymeric material, such as a silicone-filled acetal such as CELCON®.

The slide assembly 80, once molded, is secured to both the cover 60 and base 40 by inserting the sleeves 92 and 94 through openings 62 and 64 in end wall 61 of the integrally molded polymeric cover 60 and through semicylindrical guide bosses 63 and 65 spaced along the surface 67 of cover 60, as best seen in FIG. 4. The trailing edges 96 of each of the sleeves 92 and 94 are lockably held within the bosses of cover 60 by snap-locking tangs 66, which engage the edges 96 of the sleeves 92 and 94 to lockably hold the sleeves in fixed position with respect to cover 60. The legs 81 and 83 of rod 82 are secured to base 40 within semicylindrical troughs 42 and 44 by means of fastening screws 45, which extend through apertures 47 in troughs 42 and 44 in the base 40, as best seen in FIG. 6. Fasteners 45 extend through slots 91 and 93 of sleeves 92 and 94, respectively, thereby allowing cover 60, which is lockably mounted to the sleeves, to slide along legs 81 and 83 with fasteners 45 securing rod 82 to base 40 and clearing the sleeves 92, 94 during such motion.

Cover 60 defines an armrest in a preferred embodiment and includes, as seen in FIGS. 1–3 and 6, a foam polymeric padded section 70 with a suitable flexible covering upholstery material 72, which can be leather, fabric, vinyl or the like, which extends around the outer peripheral edges 68 of cover 60 and is tucked into locking engagement in a peripheral trough 69 therewith by means of a locking ring 74, as best seen in FIG. 6. Base 40 and the body of cover 60 are each integrally molded of a suitable polymeric material such as polycarbonate, thermoplastic resin, or the like, typically used in the automotive environment for interior components.

With base 40 secured to rod 82, which is pivotally mounted to the console wall 24, the entire cover assembly, including base 40 and slidable cover 60, can be pivoted to a raised open position exposing storage compartment 28, as shown in FIG. 2, by disengaging latch 48 from catch 29 (FIG. 2). The cover 60 can also be slid with respect to base 40, as seen in FIG. 3, to multiple detented positions by the detent mechanism shown in FIGS. 4 and 7.

Figure 7:
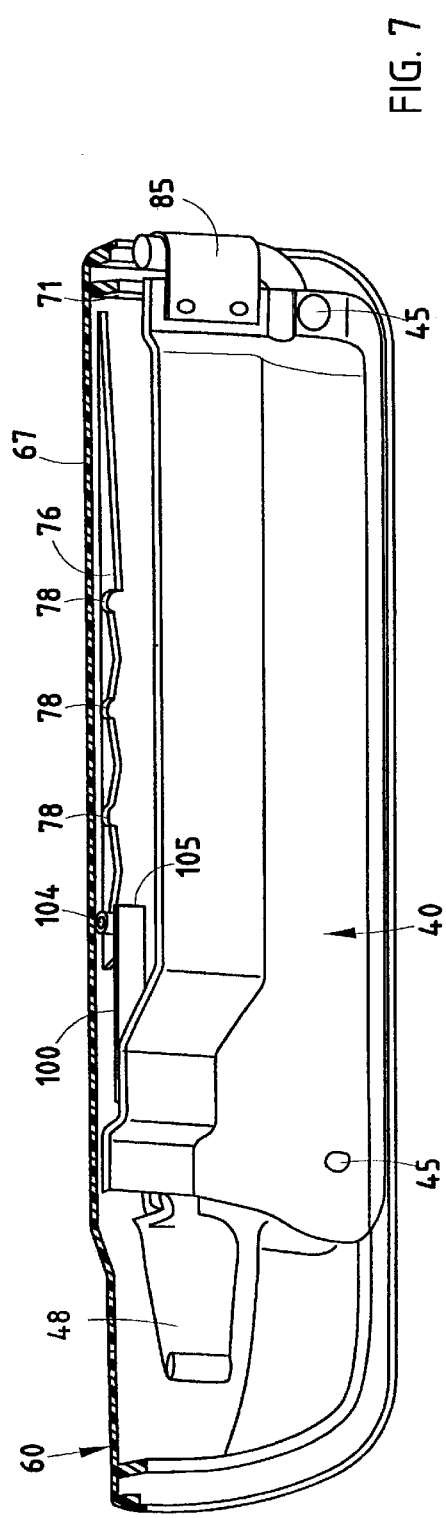
FIG. 7 is a fragmentary cross-sectional view of the detent mechanism employed for allowing the cover to be detentably adjusted with respect to the base of the cover assembly.

The detent mechanism includes a leaf spring 100 having a base 102 which is secured to surface 41 on base 40 by suitable attachment means, such as by rivets or the like. Leaf spring 100 includes a roller follower 104 at an opposite end which extends upwardly into engagement with a rib 76 integral with cover 60 and having a plurality of spaced notches 78 extending downwardly from the center area of cover floor 67, as best seen in FIG. 7. As cover 60 is moved with respect to base 40 by slide 80, follower 104 selectively detents into notches 78 to releasably hold the cover in an adjusted position, such as shown in FIG. 3. As seen in FIG. 7, the cover 60 includes a downwardly extending wall 71 which defines a stop preventing the cover 60 from being withdrawn from the slide assembly 80 by engaging the edge 105 of leaf spring 100. This prevents removal of the cover from slide assembly 80, which is secured to the base 40.

The top surface 43 of base 40 may include a recessed cup holder 50 and a storage tray 52, such that when cover 60 is moved to a forward position, as seen in FIG. 3, the base, which remains over storage compartment 28, provides access to additional vertically stacked storage areas or features which supplement the main storage compartment 28 associated with console 20.

Thus, with the cover assembly of the present invention, additional storage is provided as well as the flexibility of providing an adjustable armrest for use in providing access to a console storage compartment. The structure is relatively inexpensive to manufacture and provides a solid, reliable structure which can withstand the rigors of the automotive interior environment.

It will become apparent to those skilled in the art that various modifications to the preferred embodiment of the invention as described herein can be made without departing from the spirit or scope of the invention as defined by the appended claims.

What is claimed is:

1. A console comprising:

a body having a central opening defining a storage compartment; and a cover assembly mounted to said body, said cover assembly including a base having a forward end and a rearward end and at least one storage receptacle, a hinge extending between said base and said body with a pivot axis immediately adjacent one of said ends, and a cover slidably mounted to said base, said cover assembly further including a slide assembly defined by at least one rod secured to said base, at least one sleeve coupled to said cover, and a polymeric slide extending between said rod and said sleeve.

2. The console as defined in claim 1 wherein said cover assembly includes a pair of spaced rods and a pair of spaced sleeves aligned to receive said rods.

3. A console comprising:

a body having a central opening defining a storage compartment; and a cover assembly mounted to said body, said cover assembly including a base, a hinge extending between said base and said body, and a cover slidably mounted to said base, said cover assembly further including a slide assembly defined by a pair of spaced rods and a pair of spaced sleeves aligned to receive said rods wherein said spaced rods are legs of a generally U-shaped member having a base leg coupled to said base and wherein said sleeves are coupled to said cover, and a polymeric slide extending between said rods and said sleeves.

4. The console as defined in claim 3 wherein said hinge comprises a torque fitting coupled to said base leg and to said body for pivotally mounting said cover assembly to said body.

5. The console as defined in claim 4 and further including detent structure extending between said cover and said base to selectively hold said cover in at least one position displaced from said base.

6. The console as defined in claim 5 wherein said detent structure comprises a rib extending from said cover toward said base and having a plurality of notches therein and a spring-loaded follower mounted to said base and extending into engagement with said rib.

7. An armrest comprising:

a support; and a cover assembly mounted to said support, said cover assembly including a base, a cover, and a slide assembly slidably coupling said cover to said base, said slide assembly defined by a pair of spaced rods secured to one of said base and said cover, and a pair of sleeves coupled to the other of said cover and base, and polymeric slides extending between said rods and said sleeves, wherein said base includes at least one of a cup holder and a storage bin formed therein which are exposed for use when said cover is slidably moved from a position aligned with said base to a position displaced from said aligned position, and further including detent structure extending between said cover and said base to selectively hold said cover in at least one position displaced from said base wherein said detent structure comprises a rib extending from said cover toward said base and having a plurality of notches therein and a spring-loaded follower mounted to said base and extending into engagement with said rib.

8. The armrest as defined in claim 7 and further including a hinge coupling said cover assembly to said support.

9. The armrest as defined in claim 8 wherein said spaced rods are legs of a generally U-shaped member having a base leg.

10. The armrest as defined in claim 9 wherein said hinge comprises a torque fitting coupled to said base leg and to said support for pivotally mounting said cover assembly to said support.

11. The armrest as defined in claim 10 wherein said support includes a storage compartment selectively covered by said cover.

12. A vehicle console comprising:

a body having a central opening defining a storage compartment; and a cover assembly mounted to said body, said cover assembly including a base and a hinge extending between said base and said body, said cover assembly further including a cover and a slide assembly slidably coupling said cover to said base spaced rods which are legs of a generally U-shaped member having a base leg coupled to said base and a pair of spaced sleeves aligned to receive said rods.

13. The console as defined in claim 12 wherein said hinge comprises a torque fitting coupled to said base leg and to said body for pivotally mounting said cover assembly to said body.

14. The console as defined in claim 13 and further including detent structure extending between said cover and said base to selectively hold said cover in at least one position displaced from said base.

15. The console as defined in claim 14 wherein said detent structure comprises a rib extending from said cover toward said base and having a plurality of notches therein and a spring-loaded follower mounted to said base and extending into engagement with said rib.

16. The console as defined in claim 12 wherein said base includes at least one of a cup holder and storage bin formed therein which are exposed for use when said cover is slidably moved from a position aligned with said base to a position displaced from said aligned position.

17. A vehicle armrest comprising:

a support for attachment to a vehicle, said support having a storage compartment; and a cover assembly and a hinge coupling said cover assembly to said support for selectively gaining access to said storage compartment, said cover assembly including a base, a cover, and a slide assembly slidably coupling said cover to said base, said slide assembly defined by a pair of spaced rods secured to one of said base and said cover, and a pair of sleeves coupled to the other of said cover and base, and polymeric slides extending between said rods and said sleeves, wherein said spaced rods are legs of a generally U-shaped member having a base leg, and wherein said base includes at least one of a cup holder and a storage bin formed therein which are exposed for use when said cover is slidably moved from a position aligned with said base to a position displaced from said aligned position, and further including detent structure extending between said cover and said base to selectively hold said cover in at least one position displaced from said base.

18. The armrest as defined in claim 17 wherein said hinge comprises a torque fitting coupled to said base leg and to said support for pivotally mounting said cover assembly to said support.

\* \* \* \* \*

UNITED STATES PATENT AND TRADEMARK OFFICE
CERTIFICATE OF CORRECTION

PATENT NO.    : 6,419,314 B1
DATED         : July 16, 2002
INVENTOR(S)   : Scheerhorn It is certified that error appears in the above-identified patent and that said Letters Patent is hereby corrected as shown below:

Column 3,
Line 2, after "CELCON®" insert -- In a preferred embodiment of the invention, the slides 95 and 97 are integrally molded in place between sleeves 92 and 94 and U-shaped rod 82 by a process described in connection with U.S. patent application entitled EXTRUDED VISOR CONTROL, filed on February 26, 1998, Serial No. 09/031,405, now U.S. Patent No. 6,174,019, the disclosure of which is incorporated herein by reference. --

Signed and Sealed this

Fifth Day of November, 2002

*Attest:*

JAMES E. ROGAN
*Director of the United States Patent and Trademark Office*

*Attesting Officer*